United States Patent

Scherrer et al.

[11] Patent Number: 5,597,009
[45] Date of Patent: Jan. 28, 1997

[54] VACUUM-ENCLOSED INTEGRAL CRYOGENIC VALVE

[75] Inventors: Norbert Scherrer, St Just; Philippe Gulion, La Chapelle Reanville; Etienne Hardouin, Hennezis, all of France

[73] Assignee: Societe Europeenne de Propulsion, Suresnes, France

[21] Appl. No.: 403,650

[22] Filed: Mar. 14, 1995

[30] Foreign Application Priority Data

Mar. 17, 1994 [FR] France ..................... 94 03126

[51] Int. Cl.$^6$ .................. F16K 31/04; F16K 31/10
[52] U.S. Cl. ................. 137/375; 137/625.4; 251/129.11; 251/129.15; 251/335.3; 62/50.7
[58] Field of Search .............. 251/129.15, 129.11, 251/266, 227, 335.3; 137/375, 625.4, 625.5; 62/50.7

[56] References Cited

U.S. PATENT DOCUMENTS

| | | | |
|---|---|---|---|
| 3,203,628 | 8/1965 | Schoch | 62/50.7 |
| 3,573,863 | 4/1971 | Doors et al. | |
| 5,228,472 | 7/1993 | Ougiya et al. | |

FOREIGN PATENT DOCUMENTS

| | | | |
|---|---|---|---|
| 0089563 | 9/1983 | European Pat. Off. | |
| 2382638 | 9/1978 | France | |
| 55-155980 | 12/1980 | Japan | 137/375 |
| 56-63170 | 5/1981 | Japan | 251/129.11 |
| 61-252984 | 11/1986 | Japan | 251/129.15 |
| 4-248082 | 9/1992 | Japan | 251/129.15 |

OTHER PUBLICATIONS

"Axially Symmetric Electromagnetic High–Vacuum Tube", B. Sh. Berenshtein, et al, Instruments and Experimental Techiques, No. 1, Jan. 1968, New York, U.S. pp. 165–166.

Primary Examiner—James Larson
Attorney, Agent, or Firm—Weingarten, Schurgin, Gagnebin & Hayes

[57] ABSTRACT

The present invention relates to an electrically-controlled vacuum-enclosed cryogenic valve including firstly a body receiving the seat for a valve member, and inlet and outlet channels for a cryogenic fluid, the body and the channels being disposed in an enclosure in which a vacuum is created, and secondly a moving valve member whose stem is actuated by moving core and a control electromagnetic winding, a return spring pressing the valve member against its seat in the absence of excitation. In accordance with the present invention, the moving core of such a valve is placed inside the vacuum enclosure which is secured to a a sleeve that separates the moving core from the control electromagnetic winding, which is placed outside the enclosure. Preferably, a bellows that is secured both to the valve body and to the stem implements sealing between the vacuum enclosure and the fluid flowing through the channels. The present invention applies particularly to valves having two or three ports, or to valves for regulating cryogenic fluids e.g. such as liquid helium, nitrogen, oxygen, or hydrogen.

6 Claims, 4 Drawing Sheets

VACUUM-ENCLOSED INTEGRAL CRYOGENIC VALVE

FIELD OF THE INVENTION

The present invention relates to an electromagnetic valve specially designed for cryogenic fluid circuits, e.g. liquefied gas circuits.

PRIOR ART

Such an electromagnetic valve generally includes a valve body provided with channels through which fluid can flow and having a central chamber in which the seat for the valve member is formed, which chamber is closed in fluid-tight manner by a guide tube (also referred to as a "cryogenic extension") extending out from the cold zone to a hot zone containing the control mechanism for displacing the valve member.

Unfortunately, such cryogenic valves suffer from certain drawbacks. In particular, the heat flow between the hot zone (outside) and the cold zone (inside) is transmitted by conduction along the stem of the valve member to the fluid, and this may give rise to evaporation of part of the fluid. Moreover, on opening the valve, the gas cushion formed in this way by the evaporation may be entrained with the liquid, thereby disturbing the flow of the liquid. Furthermore, in order to ensure that conduction losses are small, it is necessary to have a valve member stem (and therefore an extension) that is very long.

U.S. Pat. No. 3,573,863 discloses a valve for controlling a cryogenic fluid. That valve has two concentric housings closed by first and second bellows, and between which an evacuated space is created. By means of this structure, it is possible to omit the seal that exists in conventional valves at the cold zone. However, the conduction losses via the central stem are not decreased, and the overall size of the valve is considerable because of the need to place the second bellows in the hot zone.

DESCRIPTION OF THE INVENTION

An object of the present invention is to provide a cryogenic valve that eliminates the risks of the cryogenic fluid evaporating, thereby limiting overall heat losses. Another object of the present invention is to enable the size (and therefore the mass) of such a valve to be reduced significantly.

To these ends, the invention provides an electrically-controlled vacuum-enclosed cryogenic valve including firstly a body receiving the seat for a valve member, and inlet and outlet channels for a cryogenic fluid, the body and the channels being disposed in an enclosure in which a vacuum is created, and secondly a moving valve member whose stem is actuated by excitation means comprising a moving core and a control electromagnetic winding, a return spring pressing the valve member against its seat in the absence of excitation, wherein the moving core is placed inside the vacuum enclosure. In a particular embodiment, the moving core is separated from the control electromagnetic winding, which is placed outside the enclosure, by a sleeve that is secured to the vacuum enclosure.

By disposing the active core of the excitation winding inside the vacuum enclosure, it is possible to eliminate conduction losses Conveyed by the stem of the valve member. Furthermore, it is possible to omit the conventional cryogenic extension which is essential in prior art devices, thereby enabling the mass and the size of such a valve to be reduced considerably.

Naturally, sealing means for sealing the enclosure relative to the outside are provided at the valve, and a bellows that is secured both to the valve body and to the stem is also provided so as to implement sealing between the vacuum enclosure and the fluid flowing through the channels.

This structure is applicable to any type of valve, e.g. a valve that has two or three ports, and that is monostable or bistable, or a regulating valve controlled by a stepper motor.

BRIEF DESCRIPTION OF THE DRAWINGS

Other characteristics and advantages of the present invention appear more clearly from the following description given by way of non-limiting example, and with reference to the accompanying drawings, in which.

DESCRIPTION OF PARTICULAR EMBODIMENTS

Figure 1:
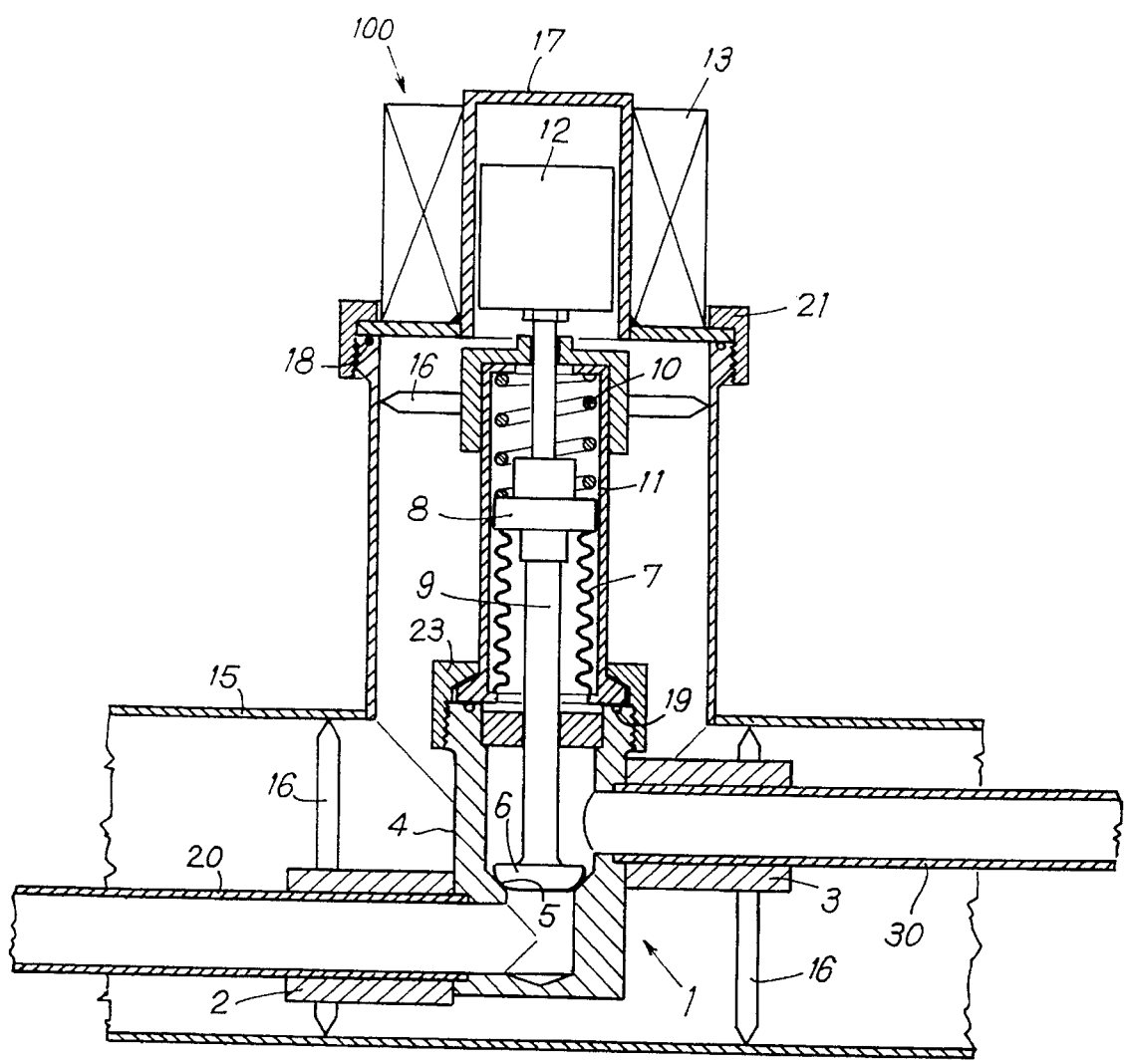
FIG. 1 shows an embodiment of a two-port cryogenic electromagnetic valve of the invention.

FIG. 1 shows a first embodiment of a vacuum-enclosed cryogenic valve of the invention. It includes a body 1 with an inlet channel (e.g. 2) and an outlet channel 3, which channels are connected to respective ducts 20, 30 through which a cryogenic fluid can flow. The channels 2, 3 communicate with a central chamber 4 in which a seat 5 is formed for a valve member 6. The chamber is sealed by sealing means, namely a bellows 7 which is secured at a first one of its ends to chamber 4, and at its second end to a first face of a shoulder 8 of the stem 9 of the valve member. That face of the shoulder 8 which is opposite from its first face constitutes a first abutment face for a return spring 10 (for holding the valve member against its seat), the other abutment face for the return spring being constituted by the inside wall of a tube 11 surrounding the stem 9 of the valve member, and secured to the chamber 4. An opening is provided in the tube 11 at its end that is further from the chamber 4 to enable the stem of the valve member to pass therethrough. The free end of the stem of the valve member is fixed to a core 12 of excitation means 100 also including an electromagnetic control winding 13. The body 1 of the valve and the tube 11 that is connected to it are placed inside a vacuum enclosure 15, the enclosure being centered and fixed relative to the body of the valve via arms 16 extending from the channels 2, 3 and from the tube 11 to the inside wall of the enclosure. The enclosure is closed at the tube by means of a sleeve which is made of a magnetic material 17 and which surrounds the moving core 12, thereby integrating the moving core into the vacuum enclosure 15, with only the control winding 13 then remaining subjected to the outside pressure. A sealing gasket 18 seals the sleeve 17 relative to the enclosure 15, and another sealing gasket 19 seals the central chamber 4 of the valve body relative to the bellows 7 (the respective elements being fixed together by nuts, 21, 23 for example).

Operation of the valve is particularly simple. At rest, in the absence of excitation from the winding 13, the return spring 10 holds the valve member 6 against its seat, thereby preventing any communication between the inlet and outlet ducts 20, 30. In contrast, when the winding is powered, the resulting magnetic force displaces the moving core 12, thereby lifting the valve member 6 off its seat 5 and, by opening the valve, putting the cryogenic fluid ducts 20, 30 into communication with each other.

By placing the core in the vacuum enclosure (the vacuum between the walls), the heat losses are greatly reduced (conduction losses are in fact eliminated), and the problems suffered by the prior art and related to the need to bring the means for controlling and sealing the valve into the hot zone are avoided.

Figure 2:
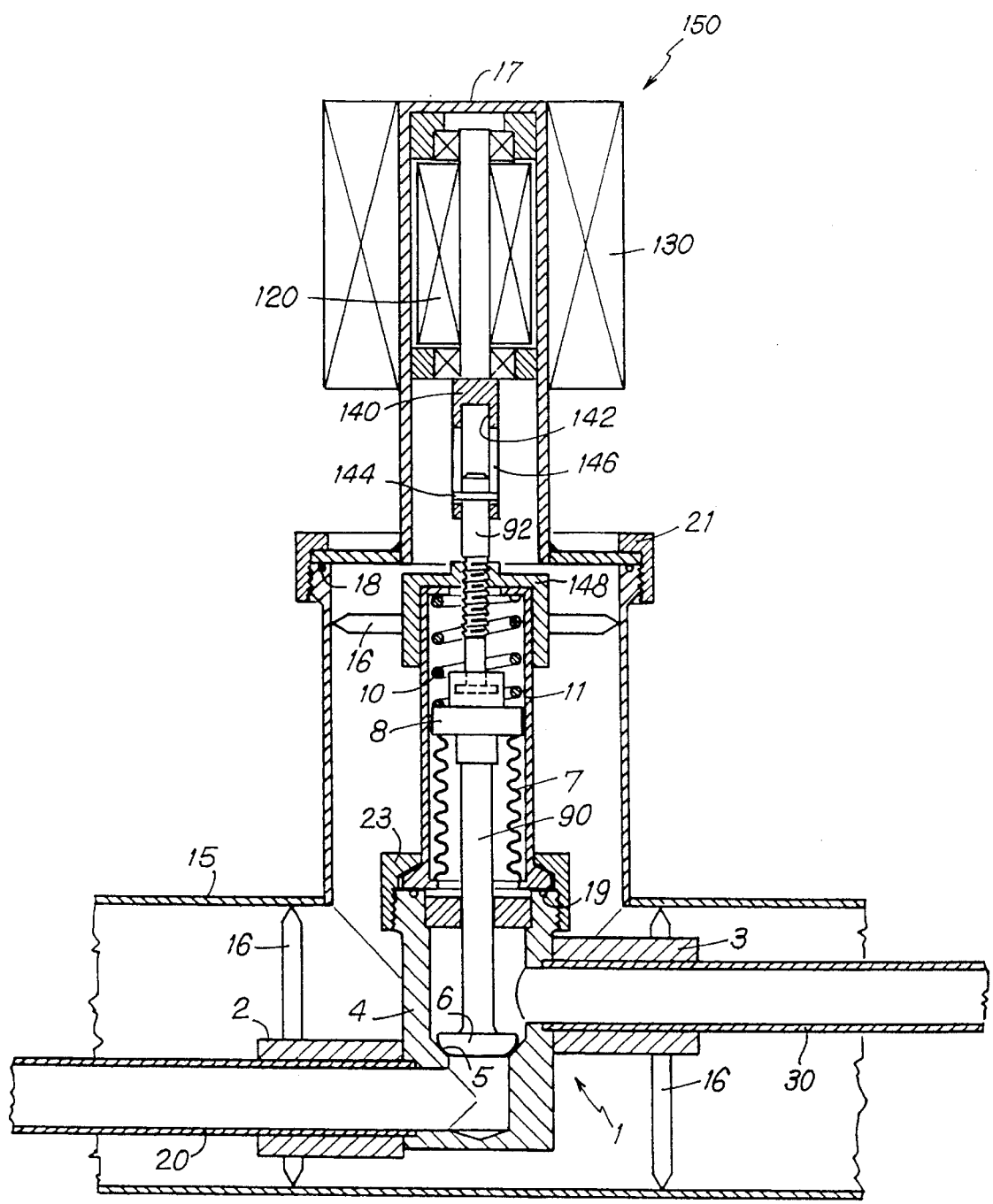
FIG. 2 shows an embodiment of a cryogenic regulating valve of the invention.

FIG. 2 is another embodiment of a cryogenic valve in which the excitation means are constituted by a stepper motor 150. Like the preceding embodiment, the rotor 120 of the motor is integrated in the vacuum enclosure 15 delimited by the sleeve 17, with the stator 130 remaining outside the enclosure. In order to enable the rotary motion delivered by the stator to be transformed into translation motion of the stem, the stem 9 is made up of two portions, namely a first portion 90 having one end formed by the valve member 6, and the other end formed by the shoulder 8, and a second portion 92 including a threaded zone (for co-operating with a nut element 148) and extending the first portion 90 of the stem from the shoulder, the second portion being mounted to rotate freely relative to the first portion. The rotor 120 includes a shaft 140 whose free end is provided with a non-through orifice 142 in which the free end of the second portion 92 of the stem 9 can slide. The stem 9 is rotated by the shaft 140 via a pin 144 passing through the end of the stem and into slots 146 provided in the shaft.

As above, it is easy to understand how this regulating valve operates. At rest, in the absence of power to the stator 130 of the stepper motor, the return spring 10 holds the valve member 6 against its seat, thereby preventing any communication between the inlet and outlet ducts 20, 30. In contrast, when the stator is powered, the rotor is displaced under drive from the magnetic forces involved, and it rotates the second portion 92 of the stem. The stem then acts on the position of the valve member relative to its seat via the screw (threaded zone of the stem)/nut (element 148) assembly. In this way, it is possible to obtain a passage for the fluid between the ducts 20, 30, the size of which passage varies as a function of the angle through which the rotor rotates.

Figure 3:
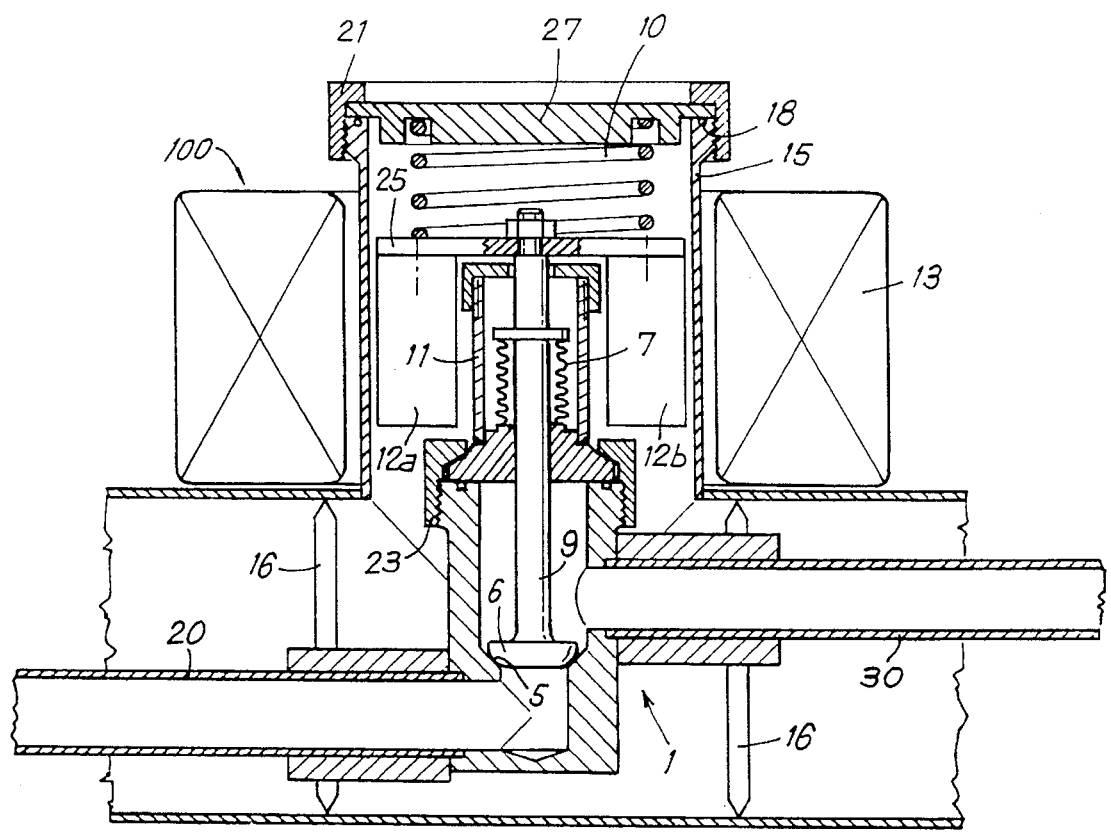
FIG. 3 shows a variant embodiment of the valve shown in FIG. 1.
Figure 4:
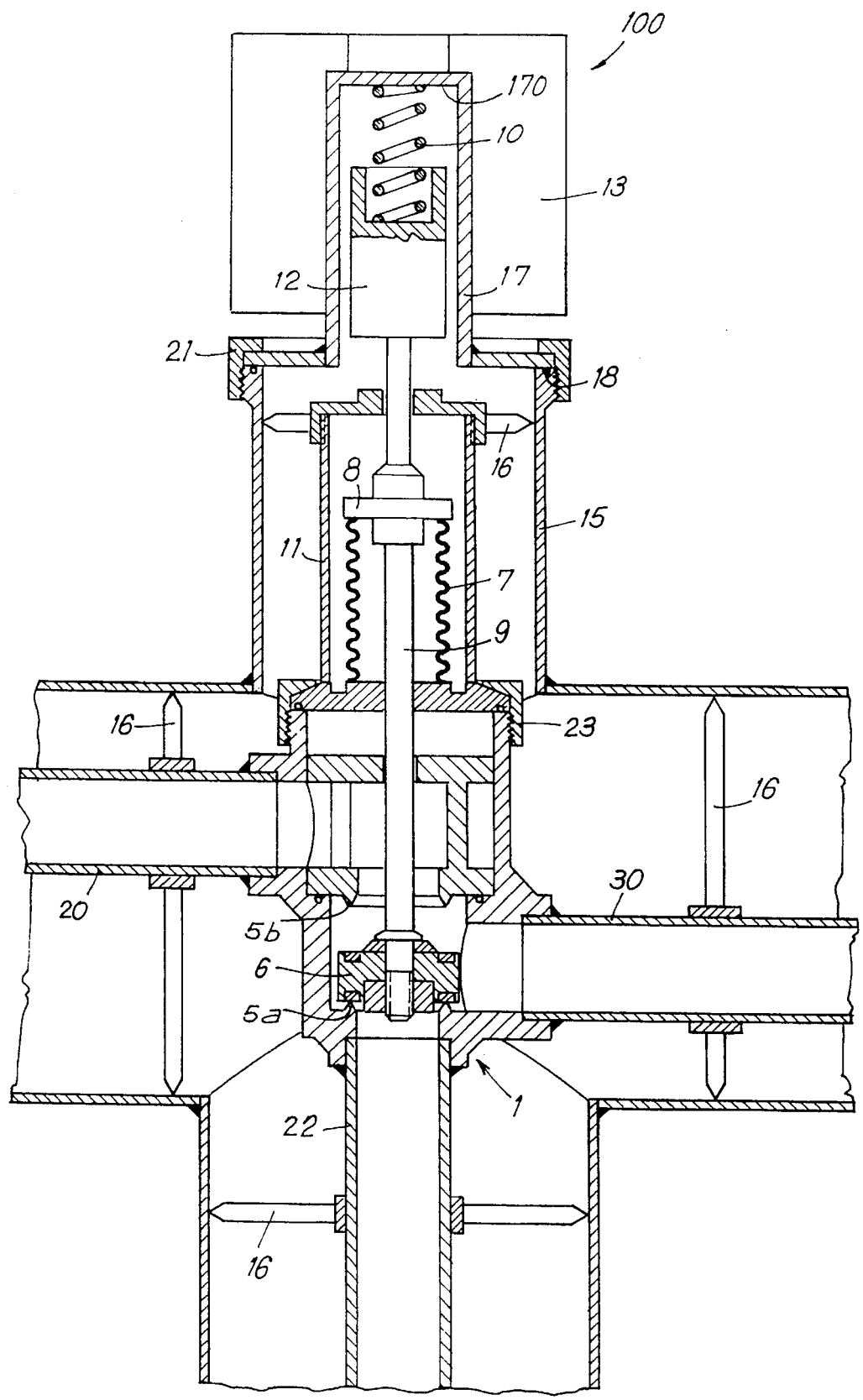
FIG. 4 is an embodiment of a valve having three ports.

FIGS. 3 and 4 show two other embodiments of cryogenic valves.

FIG. 3 is a variant of FIG. 1 in which the overall size of the valve has been further reduced. To achieve this further reduction, the core of the excitation means is formed of two elements 12a, 12b disposed on either side of the tube 11 under a disk 25 fixed to the free end of the stem 9. The return spring 10 is mounted between the top face of the disk 25 and a cover 27 closing the vacuum enclosure 15 in fluid-tight manner via a nut 21 and the sealing gasket 18, the wall of the enclosure 15 constituting the gap sleeve for the excitation means 100 which sleeve separates the elements 12a, 12b of the core from the powering winding 13.

FIG. 4 is an example of a 3-port valve with inlet ducts 20, 22 and an outlet duct 30. The ducts are connected, e.g. by welding, to the valve body 1 which includes a bottom seat 5a for the valve member and a top seat 5b therefor, between which seats the valve member 6 can be displaced. The valve body is sealed by sealing means, namely the bellows 7, a first end of which is secured to the body 1, its second end being secured to a first face of the shoulder 8 on the stem 9 of the valve member. As with the above embodiments, the free end of the tube 11, which surrounds the stem 9 of the valve member and which is secured to the body, is provided with an opening enabling the stem of the valve member to pass therethrough. However, in the example shown, the return spring 10 is not disposed between the tube 11 and the shoulder 8 of the stem, but rather it is disposed between the core 12 and an inside end wall 170 of the sleeve 17 that is secured to the vacuum enclosure 15. This valve operates in an analogous manner to the valve described with reference to FIG. 1. However, in the rest position, the fluid can pass from the first inlet duct 20 to the outlet duct 30, whereas, in an active position, the fluid can pass from the second inlet duct 22 to the outlet duct 30.

The structural simplicity of the cryogenic valves of the invention enables them to be used both at low pressures and at high pressures, and the highly compact nature of these cryogenic valves means that they can be implemented in the form of miniature valves, in particular in the field of distributing liquefied gases, e.g. such as liquid nitrogen or helium.

We claim:

1. An electrically-controlled vacuum-enclosed cryogenic valve including:

a body receiving a seat for a valve member, and inlet and outlet channels for a cryogenic fluid defining a flowpath, the body and the channels being disposed in an enclosure in which a vacuum is created; and the valve member including a stem, the valve member being actuated by excitation means comprising a moving core and a control electromagnetic winding, a return spring pressing the valve member against the seat in the absence of excitation, wherein said moving core is placed inside the vacuum enclosure and disposed outside the flowpath for the cryogenic fluid.

2. A vacuum-enclosed cryogenic valve according to claim 1, including a sleeve that is secured to the vacuum enclosure and that separates the moving core from the control electromagnetic winding, which is placed outside the enclosure.

3. A vacuum-enclosed cryogenic valve according to claim 1, including sealing means for sealing the enclosure relative to the outside.

4. A vacuum-enclosed cryogenic valve according to claim 1, including a bellows that is secured both to the valve body and to the stem so as to implement sealing between the vacuum enclosure and the fluid flowing through the channels.

5. A vacuum-enclosed cryogenic valve according to claim 1, including two inlet channels and one outlet channel for the cryogenic fluid.

6. A vacuum-enclosed cryogenic valve according to claim 1, wherein the excitation means are constituted by a stepper motor.

* * * * *